(12) United States Patent
Rithener et al.

(10) Patent No.: US 9,277,839 B2
(45) Date of Patent: Mar. 8, 2016

(54) SECURE CUP SUPPORT FOR BEVERAGE MACHINE

(75) Inventors: Blaise Rithener, La Tour-de-Peilz (CH); Antoine Cahen, Lausanne (CH)

(73) Assignee: Nestec S.A., Vevey (CH)

( * ) Notice: Subject to any disclaimer, the term of this patent is extended or adjusted under 35 U.S.C. 154(b) by 180 days.

(21) Appl. No.: 13/810,140

(22) PCT Filed: Jul. 5, 2011

(86) PCT No.: PCT/EP2011/061272
§ 371 (c)(1),
(2), (4) Date: Jan. 14, 2013

(87) PCT Pub. No.: WO2012/007313
PCT Pub. Date: Jan. 19, 2012

(65) Prior Publication Data
US 2013/0112318 A1    May 9, 2013

(30) Foreign Application Priority Data

Jul. 12, 2010  (EP) ..................................... 10169201

(51) Int. Cl.
| | | |
|---|---|---|
| A23L 1/00 | (2006.01) |
| B67D 1/00 | (2006.01) |
| A47J 31/00 | (2006.01) |
| A47J 31/44 | (2006.01) |
| B65B 1/04 | (2006.01) |
| B65B 3/00 | (2006.01) |
| B67C 3/00 | (2006.01) |

(52) U.S. Cl.
CPC .................... *A47J 31/4482* (2013.01)

(58) Field of Classification Search
CPC ..................................................... A47J 31/4482
USPC ..................... 99/275, 279; 141/375, 376, 378
See application file for complete search history.

(56) References Cited

U.S. PATENT DOCUMENTS

| 5,161,455 A | 11/1992 | Anson et al. |
| 5,353,692 A | 10/1994 | Reese et al. |
| 2006/0065126 A1* | 3/2006 | Turi ................................ 99/279 |
| 2007/0000944 A1* | 1/2007 | Cahen et al. ................... 222/108 |

(Continued)

FOREIGN PATENT DOCUMENTS

| CN | 2737277 | 11/2005 |
| CN | 2768619 | 4/2006 |

(Continued)

OTHER PUBLICATIONS

International Search Report & Written Opinion issued Jul. 27, 2011 for Intl. Appln. PCT/EP2011/061272.

(Continued)

*Primary Examiner* — Dana Ross
*Assistant Examiner* — Lindsey C Teaters
(74) *Attorney, Agent, or Firm* — K&L Gates LLP

(57) ABSTRACT

A machine (1) for dispensing a beverage (50) has: an outlet (4) for dispensing said beverage; a user-recipient support (5) movable within such machine from a position for supporting a smaller user-recipient (51) under the outlet to a position for placing a larger user-recipient (52) under the outlet; and means for stopping movement of the user-recipient support in at least one of said positions. The stopping means comprise a means (57, 58) for fastening the user-recipient support in said at least one of said positions.

14 Claims, 1 Drawing Sheet

(56) References Cited

U.S. PATENT DOCUMENTS

| | | | |
|---|---|---|---|
| 2008/0148950 A1* | 6/2008 | Cahen et al. | 99/275 |
| 2009/0159154 A1 | 6/2009 | Buchstab et al. | |

FOREIGN PATENT DOCUMENTS

| | | |
|---|---|---|
| DE | 4226151 A1 | 2/1994 |
| DE | 29810291 U1 | 10/1998 |
| EP | 0549887 A2 | 7/1993 |
| EP | 1095605 A1 | 5/2001 |
| EP | 1380243 A1 | 1/2004 |
| EP | 1440639 A1 | 7/2004 |
| EP | 1731065 A1 | 12/2006 |
| EP | 1253844 B1 | 2/2007 |
| EP | 1646305 B1 | 9/2007 |
| EP | 1859713 A1 | 11/2007 |
| EP | 1859714 A1 | 11/2007 |
| EP | 1867260 A1 | 12/2007 |
| EP | 1809151 B1 | 9/2008 |
| JP | 5127152 | 3/1976 |
| JP | 52120085 | 9/1977 |
| JP | 605637 | 1/1985 |
| JP | 02102614 | 8/1990 |
| JP | 2006314097 | 11/2006 |
| WO | 2005/004683 A1 | 1/2005 |
| WO | 2006/050769 A2 | 5/2006 |
| WO | 2007/135136 A1 | 11/2007 |
| WO | 2009/013778 A2 | 1/2009 |
| WO | 2009/016881 A2 | 2/2009 |
| WO | WO 2009016681 A2 * | 2/2009 |
| WO | 2009/043630 A2 | 4/2009 |
| WO | 2009/074550 A2 | 6/2009 |
| WO | 2009/074557 A1 | 6/2009 |
| WO | 2009/074559 A1 | 6/2009 |
| WO | 2009/130099 A1 | 10/2009 |
| WO | 2009/135869 A2 | 11/2009 |
| WO | 2010034722 | 4/2010 |
| WO | 2010/128109 A1 | 11/2010 |
| WO | 2011154492 | 12/2011 |

OTHER PUBLICATIONS

Office Action in Chinese Application 2011800346841 mailed Oct. 20, 2014. 15 pages.

Japanese Office Action for Application No. P2013-519024, Dispatch No. 236302, dated Jun. 2, 2015, 10 pages.

* cited by examiner

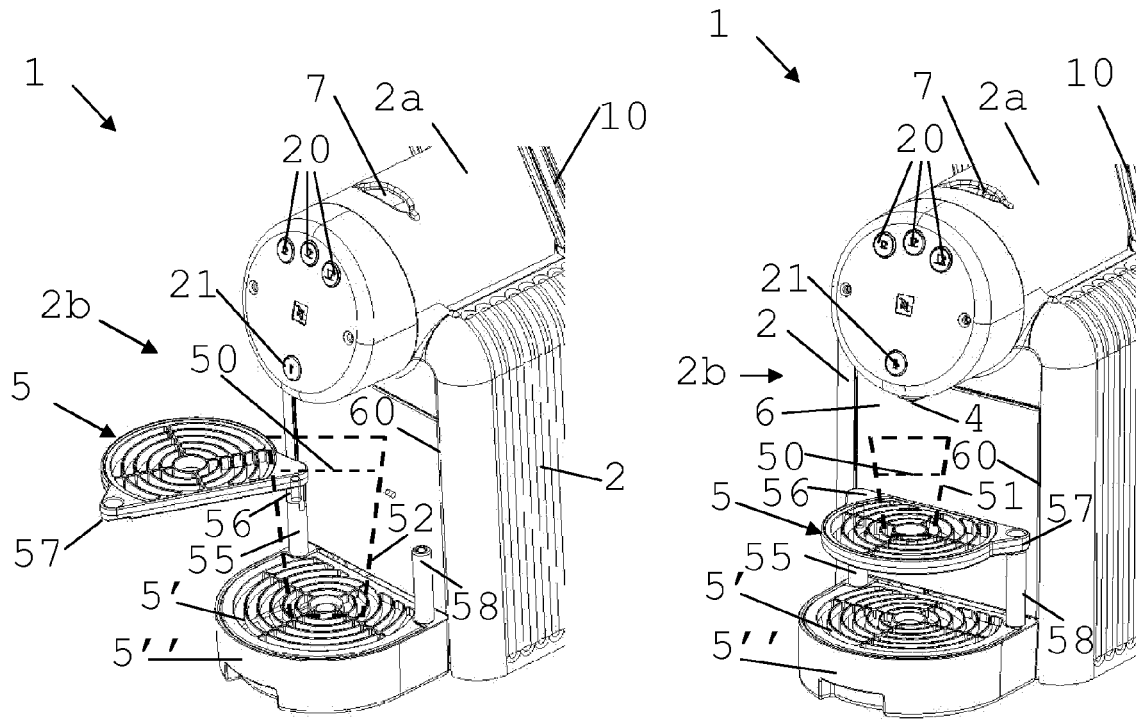
Fig. 1
Fig. 2
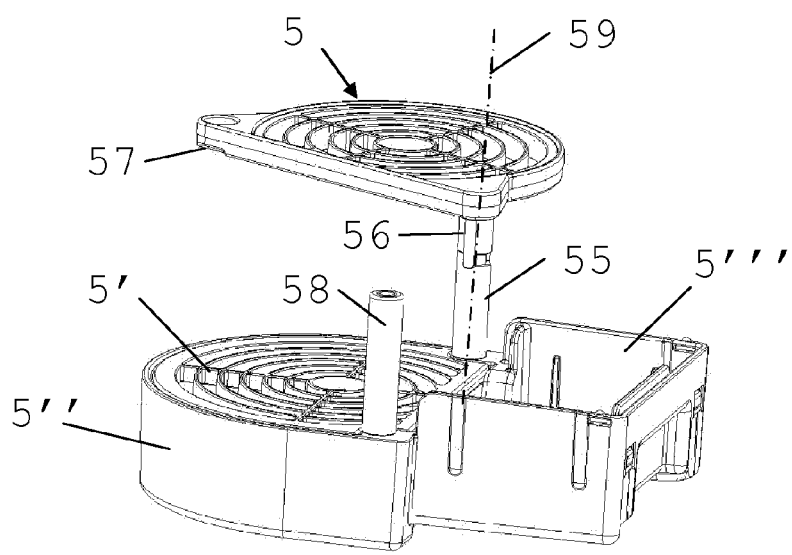
Fig. 3

SECURE CUP SUPPORT FOR BEVERAGE MACHINE

CROSS REFERENCE TO RELATED APPLICATIONS

The present application is a National Stage of International Application No. PCT/EP2011/061272, filed on Jul. 5, 2011, which claims priority to European Patent Application No. 10169201.0, filed Jul. 12, 2010, the entire contents of which are being incorporated herein by reference.

FIELD OF THE INVENTION

The field of the invention pertains to beverage dispensing machines having a support arrangement for user-recipients such as cups and/or mugs.

For the purpose of the present description, a "beverage" is meant to include any human-consumable liquid substance, such as tea, coffee, hot or cold chocolate, milk, soup, baby food, hot or cold water, etc . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Typically, the beverage outlet is located above a grid for supporting a cup or other recipient under the outlet and for the passage of possible drips from the beverage outlet or other spills into a collector tray located under the grid.

Such systems are for example disclosed in EP 1 440 639, EP 1 095 605, EP 1 731 065, EP 1 867 260, U.S. Pat. No. 5,353,692, WO 2009/013778, WO 2009/074557, WO 2009/074559 and WO 2009/135869.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water.

Drip tray devices with cup supports are well known in the art. There are also such devices that are further arranged for allowing the adjustment of the vertical position under the beverage outlet of cups of different sizes. For instance, EP 0 549 887 and U.S. Pat. No. 5,161,455 disclose devices with an adjustable cup support for small and large receptacles.

U.S. Pat. No. 5,353,692 discloses a beverage vending machine having a cup station with an upper beverage outlet and a bottom drain-gate on a drip collector. Above the drain gate, the cup station has a retractable support member for positioning small cups under the beverage outlet. This cup station is formed as a grid for allowing the passage of drips down to the drain-gate.

EP 1 731 065 discloses a beverage machine that has a drip tray device located under a beverage outlet. This device has a first support grid for a first beverage recipient covering a drip tray or collection tank. The first support grid is removable form the drip tray to give access to a second support thereunder for supporting a larger cup under the outlet. Moreover, the drip tray supports a receptacle for used capsules and can be removed en bloc with the cup support arrangement from the machine for emptying the capsule receptacle and the drip tray.

EP 1 867 260 discloses a drip tray with a cup support that is movably mounted, generally at mid-height, onto a beverage machine. The cup support has an operative horizontally extending position for positioning a small cup under the machine's beverage outlet and can be pivoted upwards against the machine's main body or otherwise moved so as to give sufficient space for positioning a large cup under the beverage outlet on a support surface located below this above movable cup support. Likewise, WO 2009/074557 discloses a beverage preparation machine with a drip tray system located under a machine's beverage outlet. The drip tray has an arrangement for evacuating liquid and for supporting a cup below the outlet and has an extension for hygienically supporting cups upon use.

SUMMARY OF THE INVENTION

The invention relates to a machine for dispensing a beverage. For instance, the machine is a coffee, tea, chocolate, cacao, milk or soup preparation machine. In particular, the machine is arranged for preparing within a beverage preparation module a beverage by passing hot or cold water or another liquid through a capsule containing an ingredient, such as a flavouring and/or nutritional ingredient, of the beverage to be prepared, such as ground coffee or tea or chocolate or cacao or milk powder.

The machine has: an outlet for dispensing such beverage; a user-recipient support movable within such machine from a position for supporting a smaller user-recipient under the outlet to a position for placing a larger user-recipient under the outlet; and means for stopping movement of the user-recipient support in at least one of said positions.

The support, in the position for larger user-recipients, may uncover a placement surface for larger user-recipients under the outlet, optionally the placement surface being a virtual surface or being formed by the support at a lower position than the position for supporting a smaller user-recipient. For example, the machine comprises a further user-recipient support, e.g. a lower support, forming the placement surface.

The principle of using a movable support for handling user-recipients of different sizes in the same machine is known, for example from EP 1 731 065, EP 1 867 260, EP 1 811 881 and WO 2009/074557, the teachings of which are hereby incorporated by way of reference.

In accordance with the invention, the stopping means comprise a means for fastening the user-recipient support in said at least one of said positions.

Hence, the support is not merely moved into the above-mentioned position(s) more or less loosely, and stopped by hitting onto an abutment or end stop like in prior art systems, but the support is fastened by appropriate means in such a position to prevent unwanted movement of the support out of this position. These means typically serve to secure the support in such a position and may provide a feedback, e.g. a sensory touch feedback, to the user for indicating that the support has been properly brought into this position. For example, the fastening means may include a "hard point" or an equivalent arrangement for informing a user that the destination position is reached.

For instance, the fastening means is arranged to fasten the user-recipient support in the position for supporting a smaller user-recipient under the outlet. Hence, the stability of the user-recipient resting on the support during its filling is ensured by the fastened support.

For instance, the fastening means is arranged to automatically fasten the support when the support reaches the abovementioned position(s). Hence, in this advantageous configuration, the user does not have to make any additional operation to fasten the support in position over and above possible manual movement of the support between the positions. The fastening means may include at least one of a magnetic fastener, a lock and/or a snap.

In one embodiment, the machine has a base to which the user-recipient support is movably connected from the position for supporting a smaller user-recipient to the position for placing a larger user-recipient. Optionally, the support may be arranged to be separable from the machine, e.g. for servicing or dismantling the machine or parts thereof.

The base may have: a first connector connected to a first connector of the movable support from the position for supporting a smaller user-recipient to the position for placing a larger user-recipient, the support remaining thus connected for the entire movement from one position to the other; and a second connector connected to a second connector of the support in such (a) position(s) and disconnected from the second support connector when the support is out of such (a) position(s), the second connectors being thus disconnectably connectable when the corresponding position is reached by the support.

These first connectors may be constrained elastically and/or gravitationally by connection and disconnection of the second connectors. For example, to make or unmake the connection between the second connectors, the system may have to undergo an elastic deformation, e.g. of the first connectors and/or the support itself may be deformed.

The machine may include a body, the base being separable from the body. For instance, the base is located in a cavity or seat of the body. The body may include a beverage preparation module with a holding frame and/or housing. Typically, the base can include a service unit.

For instance, the service unit is configured for collecting at least one of: one or more waste beverage ingredients, such as a used flavouring ingredient and/or waste water; one or more used capsules for supplying a beverage ingredient into said machine; and a cleaning agent, such as a cleaning, rinsing or descaling liquid. A suitable service unit may be configured for storing a supply of the abovementioned beverage ingredients and/or capsules before use or a supply of the abovementioned cleaning agent before use.

The service unit may include a collector for collecting solid material, such as used beverage ingredients and/or used ingredient capsules.

The service unit can comprise a reservoir for collecting liquid, such as waste beverage or liquid ingredient in particular water. The abovementioned first connector and/or second connector of the base may be fixed to the reservoir. For instance, the reservoir is covered with a further user-recipient support which is arranged to support the larger user-recipient, the further support being placed flat over the reservoir and separable therefrom by a user. The first connector and/or second connector of the base may be fixed to the further user-recipient support.

The user-recipient support is typically pivotable within such machine from the smaller user-recipient position to the larger user-recipient position, in particular pivotable along a generally vertical axis. The user-recipient may be pivotable along a generally horizontal axis, such as an axis parallel to or perpendicular to the machine's front face bearing a beverage outlet. The support may be movable in translation between these positions.

In the context of the present disclosure, the relative orientation of the machine, e.g. references to the machine's top, front, bottom, side, rear, etc., unless specified otherwise, typically relate to the orientation of operation of the machine, e.g. on top of a table, with the machine in front of a user for naturally operating the machine to dispense a beverage.

BRIEF DESCRIPTION OF THE DRAWINGS

The invention will now be described with reference to the schematic drawings, wherein FIGS. 1 and 2 are two perspective views of an embodiment of a front part of a beverage dispensing machine according to the invention; and FIG. 3 illustrates a user-recipient support combined with a base that includes a service unit for a beverage dispensing machine according to the invention, in particular as shown in FIGS. 1 and 2.

DETAILED DESCRIPTION

FIGS. 1 and 2 illustrate an embodiment of a beverage machine 1 according to the present invention. For instance, the machine is a machine for preparing and dispensing tea and/or coffee.

Machine 1 can be electrically powered, typically by the mains, via an electric cord 9.

Machine 1 has a beverage preparation module with an internal circuit for circulating liquid, e.g. water, from reservoir. The module is covered by a housing 2a and has a body 2. The beverage preparation module in the housing is arranged for holding a flavouring ingredient, in particular a pre-portioned ingredient such as an ingredient supplied to such module within a capsule, and circulating a liquid therethrough to form a beverage 50. Examples of such modules are disclosed in WO 2009/074550 and in WO 2009/130099, the teachings of which are hereby incorporated by way of reference.

Hence, the liquid, e.g. water, may be stored in the tank or reservoir and supplied to the beverage preparation module therefrom. Further details on a tank or reservoir are for example disclosed in EP 10163637.1.

Beverage 50, upon formation, can be dispensed via an outlet 4 to a dispensing area 5,5', e.g. a support for holding a user-recipient such as a cup 51 or mug 52. Typically, machine 1 has a front face 2b bearing outlet 4. The dispensing area may include a first support 5 for smaller cups 51, as illustrated in FIG. 2, that is movable away from under outlet 4 so as to give access to a lower second support 5' for larger cups or mugs 52, e.g. for dispensing lungos or extra-large beverages, as illustrated in FIG. 1. Supports 5,5' may be generally shaped as grids or perforated plates or another shape with an arrangement for draining liquids and drips, in particular from outlet 4.

User-recipient support 5 can be made pivotable within such machine 1 from the smaller user-recipient position (FIG. 2) to the larger user-recipient position (FIG. 1), in particular pivotable along a generally vertical axis 59.

As shown in greater details in FIG. 3, support 5' for larger cups or mugs 52 is located on top of a receptacle 5" for collecting the liquid and drips through support 5' and optionally through support 5 when located under outlet 4 in the configuration illustrated in FIG. 2. Receptacle 5" is connected to a secondary receptacle 5'" that is arranged to support a service unit 6. Receptacles 5",5'" form together a reservoir for collecting waste liquid draining from outlet 4 and from the abovementioned beverage preparation module.

Service unit 6 is arranged for collecting used ingredients, such as tea leaves or ground coffee, e.g. within used capsules. Service unit 6 may be a collector for accumulating solids, e.g. ingredient. Service unit 6 may have a bottom opening for evacuating liquid to receptacle 5'" located underneath.

Secondary receptacle 5'" with service unit 6 can be insertable, e.g. slidable, into a seat or cavity 60 formed in body 2 and removable therefrom for servicing, e.g. emptying the solids and/or liquids contained in reservoir 5",5'" and service unit 6. For example, the storage capacity of collector 6 for a used ingredient may be aligned to the storage capacity of the reservoir for the supply of liquid such as water, e.g. as taught in PCT/EP10/056194.

Collector 6 may be positioned underneath the beverage preparation module to collect upon beverage preparation the used flavouring ingredient evacuated to collector 6, e.g. by gravity. Collector 6 typically has an anti-clogging arrangement, as for example taught in WO 2009/074559 and in WO 2009/135869, which are hereby incorporated by way of reference.

Machine 1 has a handle 10 movable between: a transfer position (FIGS. 1 and 2) for loading the ingredient, e.g. within a capsule, into the module and/or evacuating such ingredient from the module; and a circulation position (not shown) for circulating the liquid through the ingredient.

Typically, handle 10, in particular a generally u-shaped pivotable handle, actuates an ingredient holder with an ingredient chamber, such as a brewing unit, of the beverage preparation module from: a transfer position for insertion of the flavouring ingredient into the holder via a passage 7 and/or evacuation of this ingredient from the holder; and a circulation position for circulating the liquid through this ingredient in the ingredient holder to form beverage 50. The ingredient holder, e.g. a brewing unit, may have two relatively movable parts that are moved apart for opening the ingredient holder into the transfer position and moved together for closing the ingredient holder into the circulation position. In the circulation position, the ingredient holder may tightly enclose the flavouring ingredient to ensure proper guidance of the liquid through the ingredient. Examples of suitable brewing unit configurations are for example disclosed in EP 1 646 305, EP 1 859 713, EP 1 859 714 and WO 2009/043630. Furthermore, the brewing unit may have a hydraulic sealing mechanism, e.g. as taught in EP 09172187.8, the content of which is hereby incorporated by way of reference.

In the circulation position (not shown), handle 10 is generally horizontal. In the transfer position (FIGS. 1 and 2), handle 10 is generally upright. Further details on these aspects can be found in EP 10163649.6, the content of which is hereby incorporated by way of reference.

Furthermore, machine 1 includes a user-interface 20 for initiating circulation of the liquid through the flavouring ingredient in the beverage preparation module. User-interface 20 may include a plurality of user selectors for initiating preparation of beverages of different flavours and/or of different sizes and/or different types. For instance, user-interface 20 includes a first user-selector and a second user-selector, e.g. in the form of push-and-turn buttons, for selecting the dispensing of espresso coffee and of lungo coffee.

Furthermore, machine 1 may include a master or main switch 21 for switching on and off machine 1.

Further details regarding such user-selectors can be found in EP 10163635.5 and in EP 10163649.6.

The beverage preparation module typically includes one or more of the following components:
a) the ingredient holder, such as a brewing unit, for receiving the flavouring ingredient of this beverage, in particular a pre-portioned ingredient supplied within a capsule, and for guiding an incoming flow of liquid, such as water, through this ingredient to beverage outlet 4;
b) an in-line heater, such as a thermoblock, for heating this flow of liquid to be supplied to the ingredient holder;
c) a pump for pumping liquid through the in-line heater;
d) one or more fluid connecting members for guiding liquid from a source of liquid, such as a tank of liquid, to beverage outlet 4;
e) an electric control unit, in particular comprising a printed circuit board (PCB), for receiving instructions from a user via an interface and for controlling the in-line heater and the pump; and
f) one or more electric sensors for sensing at least one operational characteristic selected from characteristics of the ingredient holder, the in-line heater, the pump, a tank, ingredient collector 6, a liquid reservoir 5",5'", a flow of liquid, a pressure of liquid and a temperature of liquid, and for communicating such characteristic(s) to the control unit.

The heater may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099, which are hereby incorporated by way of reference.

The embodiments shown in FIGS. 1 to 3 will now be discussed in greater details in relation with user-recipient support 5 and its mobility and relationship to machine 1.

As mentioned above, machine 1 includes outlet 4 for dispensing beverage 50 and user-recipient support 5 is movable within such machine 1 from a position for supporting a smaller user-recipient 51 (FIG. 2) under outlet 4 to a position for placing a larger user-recipient 52 (FIG. 1) under the outlet 4. Furthermore, machine 1 has means 57,58 for stopping movement of user-recipient support 5 in at least one of these positions. In accordance with the invention, these stopping means comprise a means 57,58 for fastening user-recipient support 5 in at least one of these positions.

Typically, fastening means 57,58 is arranged to automatically fasten support 5 when said support reaches at least one of the abovementioned positions. For instance, fastening means 57,58 comprise a magnetic fastener, a lock and/or a snap. For example, the fastening means comprises a magnetic or mechanical constrainer having: a first part 57 fixed to movable support 5 and movable therewith in machine 1; and a second part 58 stationary in machine 1. First and second parts 57,58 may be formed as a mechanical plug-and-socket arrangement, a magnet arrangement, a snap arrangement, etc . . .

Machine 1 includes a base 5',5",5'",6 to which the support 5 is movably connected from the position for supporting smaller user-recipient 51 under outlet 4 (FIG. 2) to the position for placing a larger user-recipient 52 under outlet 4 (FIG. 1). In this configuration, support 5 is connected to base 5',5", 5''',6 throughout the entire movement from the large user-recipient position (FIG. 1) to the small user-recipient position (FIG. 2).

For this purpose, base 5',5",5''',6 may have: a first connector 55 connected to a first connector 56 of the support 5 from the small user-recipient position (FIG. 2) to the large user-recipient position (FIG. 1). Connectors 55,56 may be formed on the one hand as a pivot rod or pin 55 on the one hand, and on the other hand as corresponding bearing passages 56 in support 5 for receiving the pivot rod or pin 55. Typically, connectors 55,56 are pivotably fitted together.

Furthermore, base 5',5",5''',6 can have a second connector 58 connected to a second connector 57 of the support 5 in at least one of said positions (FIG. 2) and disconnected from the second support connector 57 when the support is out of this position (FIG. 1). Connectors 57,58 may be any arrangement, in particular a mechanical and/or magnetic arrangement, reversibly constraining support 5 to base 5',5",5''',6 in this position (FIG. 2) relative to base 5',5",5''',6. For instance, first connectors 55,56 are constrained elastically and/or gravitationally by connection and disconnection of the second connectors 57,58, the constraint of first connectors 55,56 constraining second connectors 57,58 together when connected.

As mentioned above, machine 1 may include a body 2. Base 5',5",5''',6 can be made separable from the body, e.g. for servicing so that a user may disassemble base 5',5",5''',6 from body 2 and assemble them during normal use. Base includes the abovementioned collector as a service unit 6 for collecting solid material, such as used beverage ingredients and/or used ingredient capsules. The base further comprises a receptacle or pair of receptacles 5",5''' for collecting liquid, such as waste beverage or liquid ingredient in particular water. First connector 55 and/or second connector 58 of base 5',5",5''',6 can be fixed to receptacle(s) 5",5''' and/or to support 5'. The receptacle(s) 5",5''' may be formed as a single receptacle with a single cavity or with a pair of cavities separated by a partition wall or as a pair of joined or assembled receptacles.

Receptacle 5" may be covered with a further user-recipient support 5' which can be arranged to support the larger user-recipient 52 (FIG. 1), the further support 5' being placed flat over the receptacle 5" and separable therefrom for servicing by a user. First connector 55 and/or second connector 58 of base 5',5",5''',6 can be fixed to the further user-recipient support 5' or to reservoir 5",5'''.

The invention claimed is:

1. A machine for dispensing a beverage comprising:
    an outlet for dispensing the beverage;
    a first user-recipient support movable within the machine from a position for supporting a smaller user-recipient under the outlet to a position for placing a larger user-recipient under the outlet, the first user-recipient support being pivotable about a vertical axis within such machine from the smaller user-recipient position to the larger user-recipient position;
    a second user-recipient support positioned below the first user-recipient support;
    a member for stopping movement of the first user-recipient support in at least one of the positions; and
    the stopping member comprises a fastener for fastening the first user-recipient support in the at least one of the positions, the fastener being positioned on at least one connector extending between the first and second user-recipient supports and arranged to automatically fasten the first user-recipient support when the first user-recipient support reaches the at least one of the positions.

2. The machine of claim 1, wherein the fastener is arranged to fasten the first user-recipient support in the position for supporting a smaller user-recipient under the outlet.

3. The machine of claim 1, wherein the fastener comprises a magnetic fastener.

4. The machine of claim 1, wherein the fastener comprises a lock or a snap.

5. The machine of claim 1, which comprises a base to which the first user-recipient support is movably connected from the position for supporting a smaller user-recipient to the position for placing a larger user-recipient.

6. The machine of claim 5, wherein the base comprises:
    a first connector connected to a first connector of the first user-recipient support from the position for supporting a smaller user-recipient to the position for placing a larger user-recipient; and
    a second connector connected to a second connector of the first user-recipient support in the at least one of the positions and disconnected from the second support connector when the first user-recipient support is out of the at least one of the positions.

7. The machine of claim 6, wherein the first connectors are constrained elastically or gravitationally by connection and disconnection of the second connectors.

8. The machine of claim 6, which comprises a body and wherein the base is separable from the body.

9. The machine of claim 8, wherein the base comprises a service unit.

10. The machine of claim 9, wherein the base comprises a reservoir for collecting liquid.

11. The machine of claim 10, wherein the first connector or second connector of the base is fixed to the reservoir.

12. The machine of claim 10, wherein the reservoir is covered with the second user-recipient support which is arranged to support the larger user-recipient, the second user-recipient support being placed flat over the reservoir and separable therefrom for servicing by a user.

13. The machine of claim 12, wherein the first connector or second connector of the base is fixed to the second user-recipient support.

14. The machine of claim 9, wherein the service unit comprises a collector for collecting solid material, such as used beverage ingredients or used ingredient capsules.

* * * * *